US007597184B1

(12) United States Patent
Vinson

(10) Patent No.: US 7,597,184 B1
(45) Date of Patent: Oct. 6, 2009

(54) CHAIN ADJUSTING DEVICE FOR ENGINE CARRIERS

(75) Inventor: James D. Vinson, Hoover, AL (US)

(73) Assignee: Honda Motor Co., Ltd., Tokyo (JP)

( * ) Notice: Subject to any disclaimer, the term of this patent is extended or adjusted under 35 U.S.C. 154(b) by 200 days.

(21) Appl. No.: 11/693,216

(22) Filed: Mar. 29, 2007

(51) Int. Cl.
*B65G 37/00* (2006.01)
*B65G 47/84* (2006.01)
*B65G 17/38* (2006.01)
*B66C 1/00* (2006.01)

(52) U.S. Cl. .............. 198/463.1; 198/463.3; 198/463.2; 198/468.2; 294/82.1; 294/101; 294/104; 294/106; 294/82.13

(58) Field of Classification Search .............. 198/465.4, 198/466.1, 346.3, 680, 681, 685, 687, 817
See application file for complete search history.

(56) References Cited

U.S. PATENT DOCUMENTS 2,035,311 A 3/1936 Galliher
2,048,144 A 7/1936 Showers, Jr.
2,700,568 A 1/1955 Meili
2,905,501 A 9/1959 Jakubowski
2,965,408 A * 12/1960 Edwards .................... 294/81.5
3,596,969 A 8/1971 La Rosa, Jr. et al.
3,972,553 A 8/1976 Johnston
3,995,903 A 12/1976 Ernst
5,660,422 A 8/1997 Knisley
5,775,754 A 7/1998 Fredriksson
5,820,184 A 10/1998 Echenay

* cited by examiner

*Primary Examiner*—Gene Crawford
*Assistant Examiner*—Yolanda Cumbess
(74) *Attorney, Agent, or Firm*—Rankin, Hill & Clark LLP; Vincent Ciamacco

(57) ABSTRACT

An apparatus and method for the improved hanging transportation of an article having an uneven weight distribution that permits the article to hang in a balanced manner. The apparatus is attached to an overhead trolley and includes attachment plates rotatably secured to the overhead trolley and a plurality of chain assemblies. Each of the attachment plates define several chain mounting holes, with each of the chain mounting holes being formed at a predefined, individual radial spacing from a center mounting hole. By attaching the chain assembly to selected ones of the plurality of chain mounting holes, an effective chain length can be varied. The chain assemblies support the article, and adjusting the effective chain lengths permit the article to hang in a balanced manner.

13 Claims, 6 Drawing Sheets

CHAIN ADJUSTING DEVICE FOR ENGINE CARRIERS

BACKGROUND OF THE INVENTION

During a vehicle/engine assembly process, engines must be transported along an assembly line. The engine assembly process requires access to several different engine surfaces necessitating an overhead lifting and carrying assembly that creates minimal obstructions for an assembler. The overhead lifting and carrying assembly generally includes an overhead trolley from which lengths of chain are extended to carry the engine. Conventionally, at least four lengths of chains extend from the trolley, each preferably from adjacent a corner of the trolley, with pairs of chains being associated with opposite ends of the engine.

Unfortunately, engines generally have an uneven weight distribution. Therefore, the engine will not naturally hang in a balanced manner when suspended from the trolley by the chains. Therefore, in order for the engine to hang in a balanced manner, the effective lengths of the chains must be selectively altered.

Accordingly, it is known in the art to adjust the effective length of the carrying chains so as to balance the engine. The effective chain lengths are conventionally altered by preliminarily setting the chain length and then adjusting the effective chain length (i.e., the length from the trolley to a connection point). The chain length is preliminarily set by adding or removing chain links so that the chain length is slightly longer than what is desired. In this regard it is noted that conventional chain links are about 25 mm long, and that adjustments of the effective chain length that are smaller than 25 mm are often required. Such smaller adjustments to the effective chain length are normally made, through trial and error, by manipulating turnbuckles, hammerlock couplings, master chain links or some other device to shorten the effective chain length in an amount less than the length of a chain link. The adjustment of the turnbuckles, hammerlock couplings and master links is very time consuming. Further, as the balancing of the engine is accomplished through trial and error, the balancing process is imprecise and not easily reproducible for other carrying assemblies.

Therefore, there exists a need in the art for an apparatus and method to improve manual adjustment of effective chain lengths. There further exists a need in the art to facilitate balanced hanging of an object with an uneven weight distribution.

SUMMARY OF THE INVENTION

The present invention provides an apparatus and method for improved hanging transport of objects with uneven weight distributions. The present invention also relates to an improved apparatus and method for adjusting an effective chain length.

The apparatus according to the present invention includes an attachment plate defining a center mounting hole and a series of chain mounting holes. The attachment plate is mounted to an overhead carrier or trolley by mounting plates, and is rotatably secured to the mounting plates so as to permit a user to gain access to any of the chain mounting holes. The chain mounting holes lie along a line defining a spiral such that each of the chain mounting holes is at a different predefined radial spacing from the center mounting hole.

Each of the chain mounting holes is adapted to receive a conventional chain mounting shackle such that a chain assembly is selectively attachable to the attachment plate via any of the chain mounting holes. Since a radial distance between the center mounting hole and each of the chain mounting holes is different, an effective chain length can be adjusted by moving the chain assembly between the chain mounting holes. Preferably, the difference between the radial distance of adjacent chain mounting holes is a fraction of a chain link length to permit micro-adjustment of the effective chain length.

In accordance with the method of the present invention, adjusting an effective chain length so as to facilitate hanging of an object in a balanced manner includes rotating the attachment plate to access a first selected chain mounting hole and mounting the chain to the first selected chain receiving hole. The first selected chain mounting hole is at a first radial distance from the center mounting hole such that the effective chain length is the sum of the first radial distance and the chain assembly length. Thereafter, the effective chain length is adjusted by demounting the chain assembly from the first selected mounting hole, accessing a second selected mounting hole, and mounting the chain assembly to the second selected chain mounting hole. The second selected chain mounting hole is at a second radial distance from the center mounting hole such that the effective chain length is the sum of the second radial distance and the chain assembly length. Thus, the effective chain length can be selected, as desired, by mounting the chain assembly to a particular one of the plurality of chain mounting holes.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
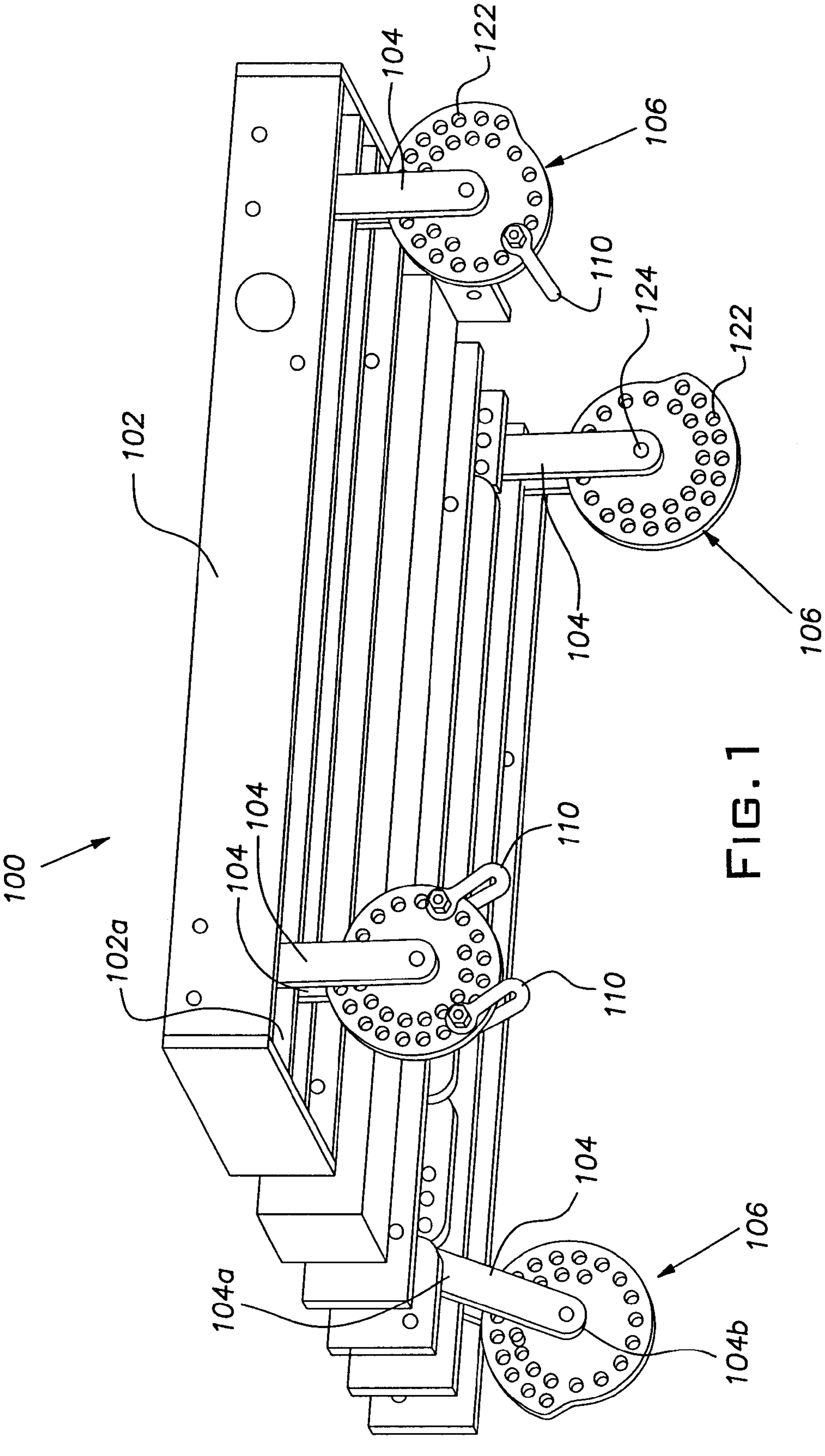
FIG. 1 is a perspective view of a trolley with attachment plates secured to corners thereof.
Figure 2:
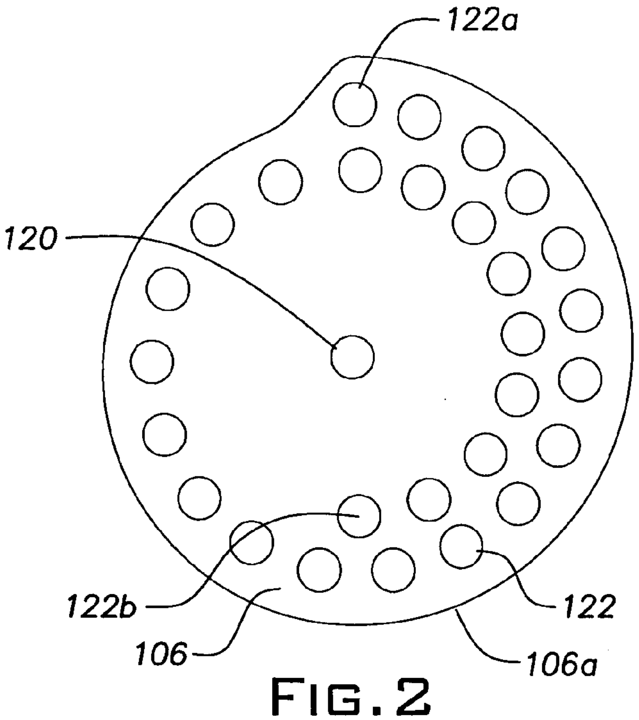
FIG. 2 is a side view of the attachment plate according to the present invention.

With reference to FIGS. 1-4B, an engine transport assembly 100 is shown to include a trolley 102 and a plurality of chain mounting assemblies 103. In the illustrated and preferred embodiment, four chain mounting assemblies 103 are used, with each chain mounting assembly 103 being secured adjacent a corner of the trolley 102. It is appreciated that, depending upon the article being transported, relatively more or less than the illustrated four chain mounting assemblies 103 may be used. It will be further appreciated that the engine transport assembly 100 is not shown to scale in the drawings.

Each of the chain mounting assemblies 103 includes a pair of mounting plates 104, an attachment plate 106, and a chain assembly 108. The chain assemblies 108 are well known in the art, and may include shackle(s) 110, hammerlock couplings 112*a*, 112*b*, and a length of chain 116, and are adapted to connect to a D-ring 114 and an article supporting hook 118, as desired. Insofar as the chain assemblies 108 are known in the art and include components that are tailored to the article being supported and transported thereby, the following description of such chain assemblies 108 will not be limited to that of the present embodiment, with it being understood that the selection and implementation of chain assemblies is not limited thereby.

The illustrated trolley 102 has a relatively open framework including a series of rafters 102*a* and cross members, and is movable along an overhead track (not shown), as is known in the art. Proximal ends 104*a* of the mounting plates 104 are bolted to opposite side surfaces of an associated rafter 102*a* such that the mounting plates 104 are pivotable relative to the trolley 102. In use, the mounting plates 104 will be aligned with (i.e., point toward) the connection point, as will be apparent to those skilled in the art. Distal ends 104*b* of the pair of mounting plates 104 pivotally receive the associated attachment plate 106, as will be discussed further hereinafter.

As will be apparent to one skilled in the art from the following discussion, the mounting and configuration of the mounting plates 104, which in the illustrated embodiment are simply steel plates with mounting holes formed in the proximal and distal ends 104*a*, 104*b* thereof, is not central to the present invention, and may be altered without departing from the scope and spirit of the present invention. For example, instead of the illustrated pair of mounting plates 104, a single mounting plate could be used to secure each attachment plate 106 to the trolley 102. Further, it is contemplated that the mounting plates may have different shapes and different means of attachment to the trolley 102.

Each attachment plate 106 is formed from a unitary piece of metal, preferably steel, and has a curved outer peripheral edge 106*a*. The attachment plate 106 defines a center mounting hole 120 and a series of chain mounting holes 122. The center mounting hole 120 is aligned with mounting holes formed in the distal ends 104*b* of the mounting plates 104 and the aligned holes receive a bolt 124 or the like that serves as an axle about which the attachment plate 106 rotates. Rotation of the attachment plate 106 permits a user to gain access to any of the plurality of chain mounting holes 122, as will be clear from the following discussion.

The chain mounting holes 122 are disposed at a fixed spacing from one another and lie along spiral curve such that each of the chain mounting holes 122 is at an individual predefined radial distance from the center mounting hole 120. In the illustrated embodiment, the chain mounting holes 122 form an outer row and an inner row of holes, with each of the holes of the outer row being spaced a generally constant or consistent first distance from the peripheral edge 106*a* of the attachment plate 106, while each of the holes of the inner row is spaced an individual or different distance from the peripheral edge 106*a*. Although the inner row of chain mounting holes is spaced relatively far from the peripheral edge 106*a* of the attachment plate 106, even the innermost hole 122*b* is accessible with a conventional shackle 110. Accordingly, each of the chain mounting holes 122 is adapted to receive a conventional shackle 110 without modification of the shackle 110 and without requiring extra components.

The chain mounting holes 122 preferably fall along an imaginary line defining a portion of an Archimedean spiral whereby, starting from a radially outermost chain mounting hole 122*a* (FIG. 2), each successive chain mounting hole 122 is progressively closer, by a fixed, constant amount, to the center mounting hole 120. In the preferred embodiment, the fixed, constant amount is about 1.0 mm. However, it is contemplated that the fixed, constant amount may be relatively more or less than 1.0 mm without departing from the scope and spirit of the present invention. In any event, providing the chain mounting holes 122 at defined spacings from the center mounting hole 120 permits the effective chain length to be easily modified by simply changing the chain mounting hole to which the chain assembly 108 is attached, as will be apparent from the following discussion.

In this regard, although not illustrated, it is contemplated that the attachment plate 106 may include an indication or marking adjacent each of the chain mounting holes 122 to permit identification of the individual holes, as may be desirable to facilitate recordation and replication of a desired chain mounting hole for a particular suspended article. Such marking, which is described further hereinafter, could be a letter, number, symbol, or the like, as would be apparent to those skilled in the art.

As noted previously, the chain assembly 108 may take many forms, but in the illustrated embodiment (FIGS. 3-4B) includes the shackle 110, hammerlock couplings 112*a*, 112*b*, and chain 116. The shackle 110 is secured to one of the chain mounting holes 122, as mentioned previously. A first hammerlock coupling 112*a* is secured between the shackle 110 and an upper link of the chain 116. A second hammerlock coupling 112*b* is secured between to the lower link of the chain 116 and the D-ring 114. In the illustrated embodiment, the D-ring 114 is secured to a pair of chain assemblies 108, and has a third hammerlock coupling 112*c* extending downwardly therefrom to which the article supporting hook 118 is attached via a further shackle (FIG. 4B) if necessary or desired. It will be appreciated that the D-link 114 may be thought of as the connection point, whereby the effective chain length is the distance between the D-link 114 and the trolley 102. The article supporting hook 118 has a lower end that extends into a receptacle of the article 126, as is known in the art.

Figure 4A:
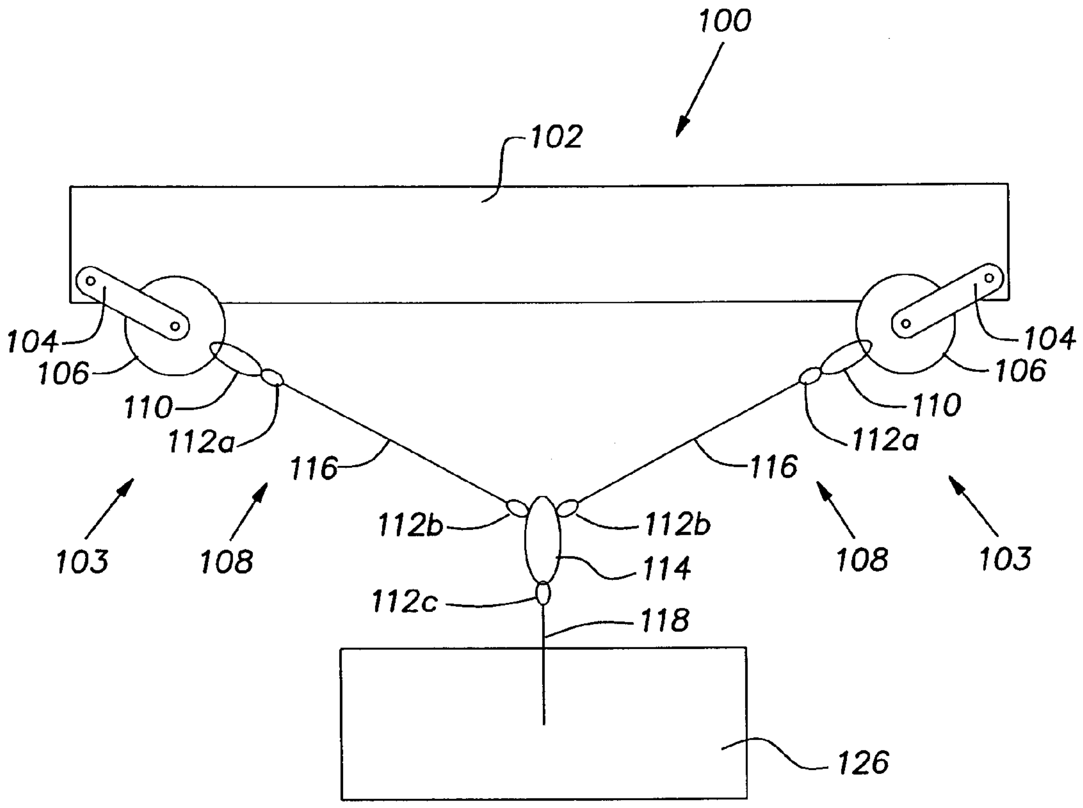
FIG. 4A schematically illustrates an end view of the engine transport assembly showing connection of the chain mounting assemblies to a supported article.
Figure 4B:
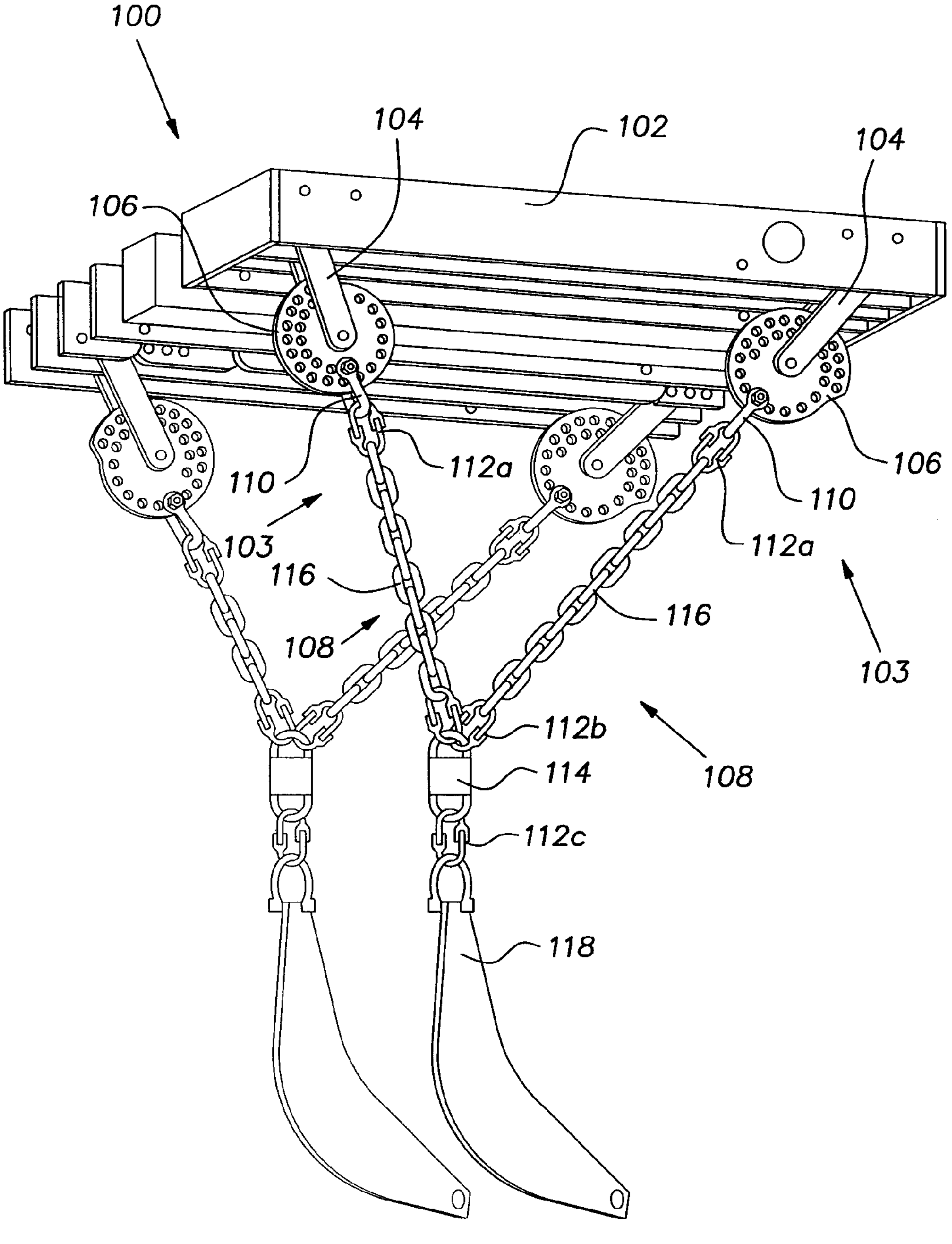
FIG. 4B is a schematic perspective view of an engine transport assembly similar to FIG. 1, but showing the chain mounting assemblies secured thereto.

Thus, and with reference to FIG. 4, it will be appreciated that the chain mounting assemblies 108 are used in pairs, and that each pair of chain mounting assemblies 108 supports an end of the supported article 126. By adjusting the effective length of each chain assembly 108, the forces applied to the article via the article supporting hooks 118 can be varied so as to cause the article 126 to hang in a balanced fashion.

Figure 5:
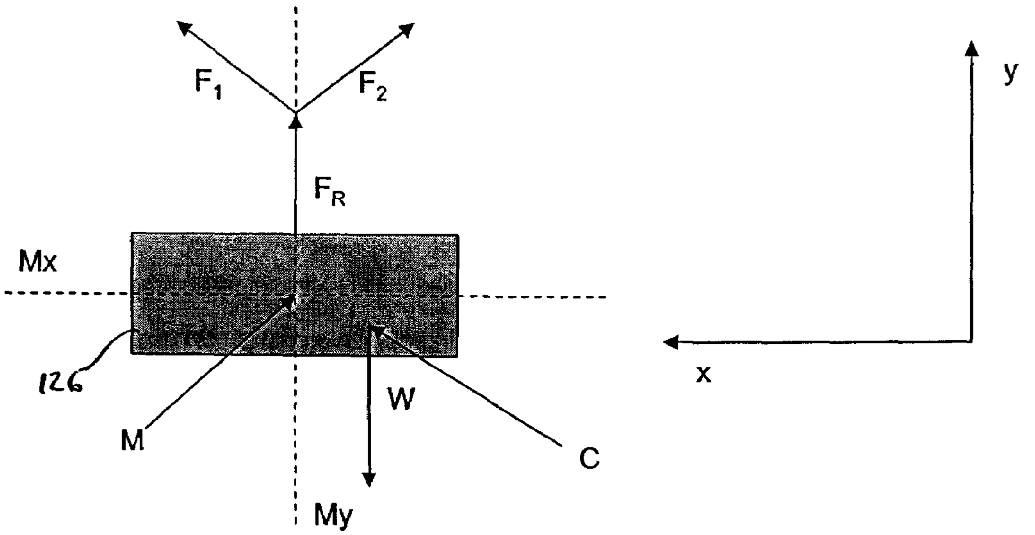
FIG. 5 is a free-body diagram showing the forces acting on the engine in an unbalanced state.
Figure 6:
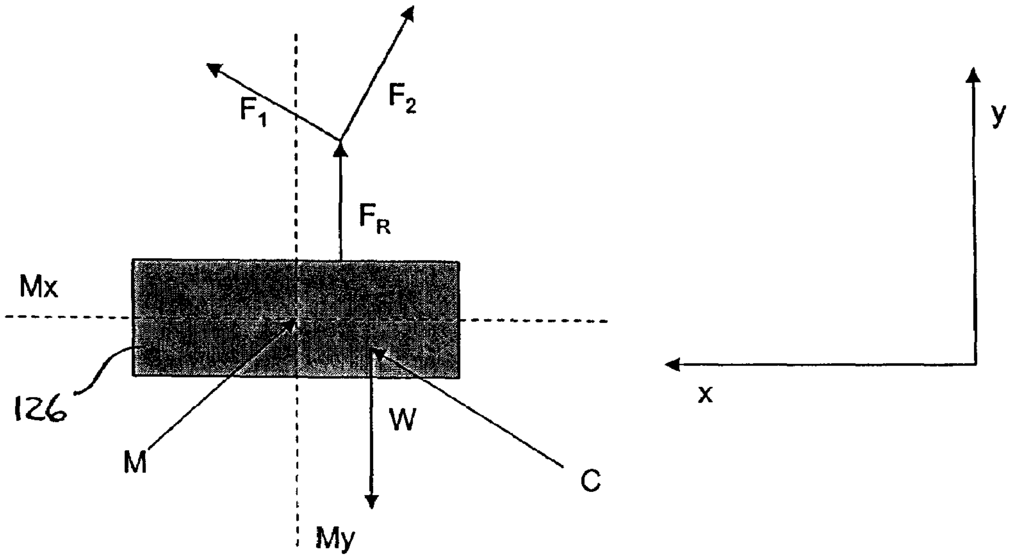
FIG. 6 is a free-body diagram showing the forces acting on the engine in a balanced state.

With reference to FIGS. 5 and 6, the forces acting on the article 126 are shown. In FIG. 5, the article 126 is shown in an unbalanced state. The article 126 has a midpoint M and a center of gravity C. The center of gravity C is shown in a representative manner to show the fact that the article 126 has an uneven weight distribution and will therefore have a center of gravity that is not aligned with the midpoint M. The position of the center of gravity C is only representative and not exact. Midpoint M defines a plane $M_y$ along the y-axis and preferably perpendicular to a floor, and a plane $M_x$ along the x-axis and preferably parallel to the floor. Upward forces $F_1$, $F_2$, and $F_R$ are the forces counteracting the force of gravity W such that the article 126 hangs in equilibrium when the net force equals zero (i.e., $F_1+F_2+F_R+W=0$).

Vector W represents the resultant force associated with the weight of the article 126. As force W is not aligned with the midpoint M, the article 126 will not hang in a balanced manner according to its center of gravity unless the stabilizing upward forces $F_1$, $F_2$ and $F_R$ account for the displacement of force W. FIG. 6 shows the forces acting upon the article 126 in a balanced state. Forces $F_1$ and $F_2$ are realigned yielding a resultant upward force $F_R$ which is no longer aligned with the midpoint M. Proper manipulation of the direction and amounts of forces $F_1$ and $F_2$ results in the article 126 hanging in a balanced state according to center of gravity C.

The manipulation of force vectors $F_1$ and $F_2$ is accomplished by adjustment of the effective chain lengths. Adjusting the effective chain lengths changes the angle of engagement of the chains 116 with the D-link 114, which effects both the direction and amount of forces, $F_1$ and $F_2$.

Figure 7:
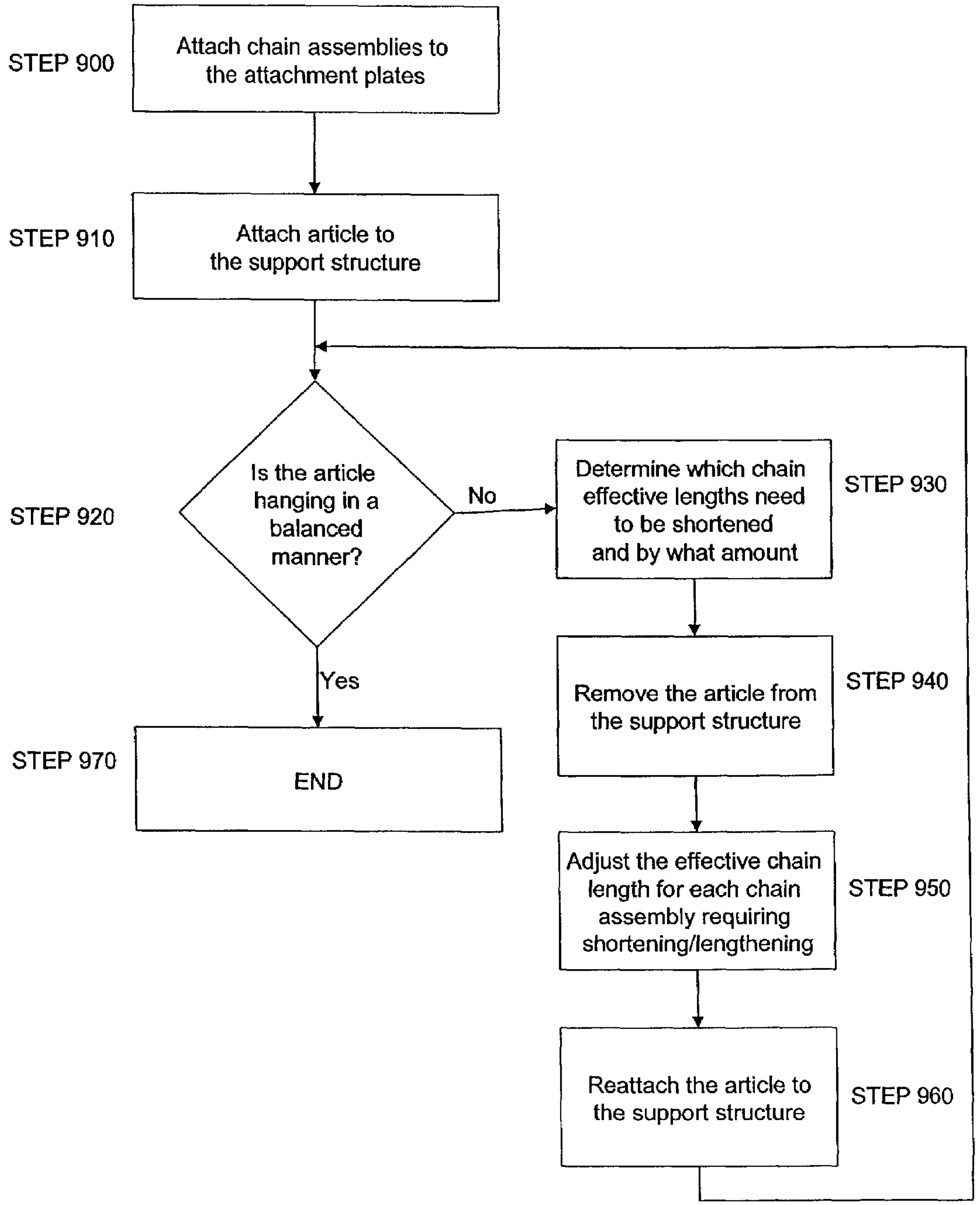
FIG. 7 is a flowchart illustrating the method of balancing the hanging engine.

With reference to FIG. 7, a method of the present invention associated with achieving the balanced state of FIG. 6 will be explained. Initially, a chain assembly 108 including a chain 116 of approximately the correct length is attached to each attachment plate 106 in the manner described above (STEP 900). As noted previously, the attachment plates 106 allow for effective chain length modifications in an amount less than the length of one chain link. As is known by those skilled in the art, adjustment of the effective chain length of amounts greater than the length of one chain link (i.e., approximately 25 mm) is accomplished by adding or removing chain links, while micro-adjustment of effective chain length (i.e., in amounts of 1 mm) is accomplished by changing the chain mounting hole 122 to which the chain assembly 108 is mounted.

The appropriate approximate chain length can be determined through a trial and error method involving hanging an article 126 from the hook 118, determining the extent to which the article 126 is unbalanced, removing the article 126 from the hook 118, removing an appropriate number of chain links from the chains 116, and re-hanging the article from the hook 118 and determining whether the article 126 is hanging almost balanced.

It is important to recognize the difference between the length of the chain 116 and the effective chain length. The length of the chain 116 is simply equal to the number of chain links multiplied by the chain link length. As used herein, the effective chain length is the distance from the trolley 102 to the connection point (i.e., D-link 114). The attachment plate 106 provides a method for reducing or increasing the effective chain length by simply changing the particular chain mounting hole 122 to which the chain assembly 108 is mounted.

Once chain assemblies 108 including chains 116 of approximately the appropriate length are attached to the attachment plates 106, the article 126 is attached to the hooks 118 (support structure) so the article 126 is hanging below the assembly (STEP 910). The article 126 is then inspected to determine whether the article 126 is hanging in a balanced manner (STEP 920). If the article 126 is not hanging in a balanced manner, then a balancing operation is performed (STEPS 930-960).

The balancing operation involves the initial step of determining which specific chains mounting assemblies 103 need to be shortened and by what amount the effective chain length needs to be shortened (STEP 930). The determination of which chain mounting assembly/effective chain length needs be shortened can be accomplished through several different methods, and the exact method to be employed is dependent on the required precision of balance for the hanging object. Normally, the determination of the shortening amounts can be determined by an estimation based on the visual appearance of the article 126. If a high level of precision is required, then more complex mechanical or electrical article balancing system can be utilized.

The article 126 is then removed from the article supporting hooks 118 (STEP 940). The effective chain lengths are then adjusted in the amount determined to allow the article 126 to hang in a balanced state (STEP 950). Each of the individual effective chain lengths are adjusted by taking the shackle 108 out of the first chain mounting hole 122, rotating the attachment plate 106 so as to access a second chain mounting hole 122, which is closer to or further from the center mounting hole 120, and mounting the shackles 108 in the second chain mounting hole 122. Once the effective chain lengths are adjusted for each chain mounting assembly 103, the article 126 is re-hung from the hooks 118 (STEP 960) and the balanced condition of the article 126 is evaluated (STEP 920). If the article 126 is still not hanging in a balanced manner, then the balancing operation (STEPS 930-960) is repeated. Otherwise, the process concludes (STEP 970).

It is apparent that an advantage of the present invention is that the balancing method is easily reproducible, and need only be carried out once per object (i.e., article 126) to be transported. To reproduce the results of the above-described balancing process for articles on different assemblies 100, the attachment plates 106 preferably include indicia to facilitate identification of each attachment plate and each of the chain mounting holes 122. For example, each of the attachment plates may be assigned a letter (A-D), and each of the chain mounting holes 122 may be assigned a number (i.e., 1–N, with N being the total number of chain mounting holes 122).

For example, if there are twenty five chain mounting holes 122 in each attachment plate 106, then the chain mounting holes will be numbered from 1 to 25. Accordingly, the twelfth chain mounting hole 122 in attachment plate B could be designated as B12. Using this method, the specific chain mounting hole 120 for each attachment plate 106 can be quickly identified. Then, the number of chain links comprising the chain 116 associated with each attachment plate 106 is recorded. In this example, assuming that three chain links are present in the chain 116 attached to attachment plate B, the assembly for that attachment plate 106 could be expressed as B12-3. This would correspond to attachment plate B, twelfth chain mounting hole 122, where the chain has three chain links. Such an expression could be generated for each attachment plate A-D and the exact set-up for each assembly 100 resulting in a balanced article 126 can be recorded and subsequently reproduced.

Figure 3:
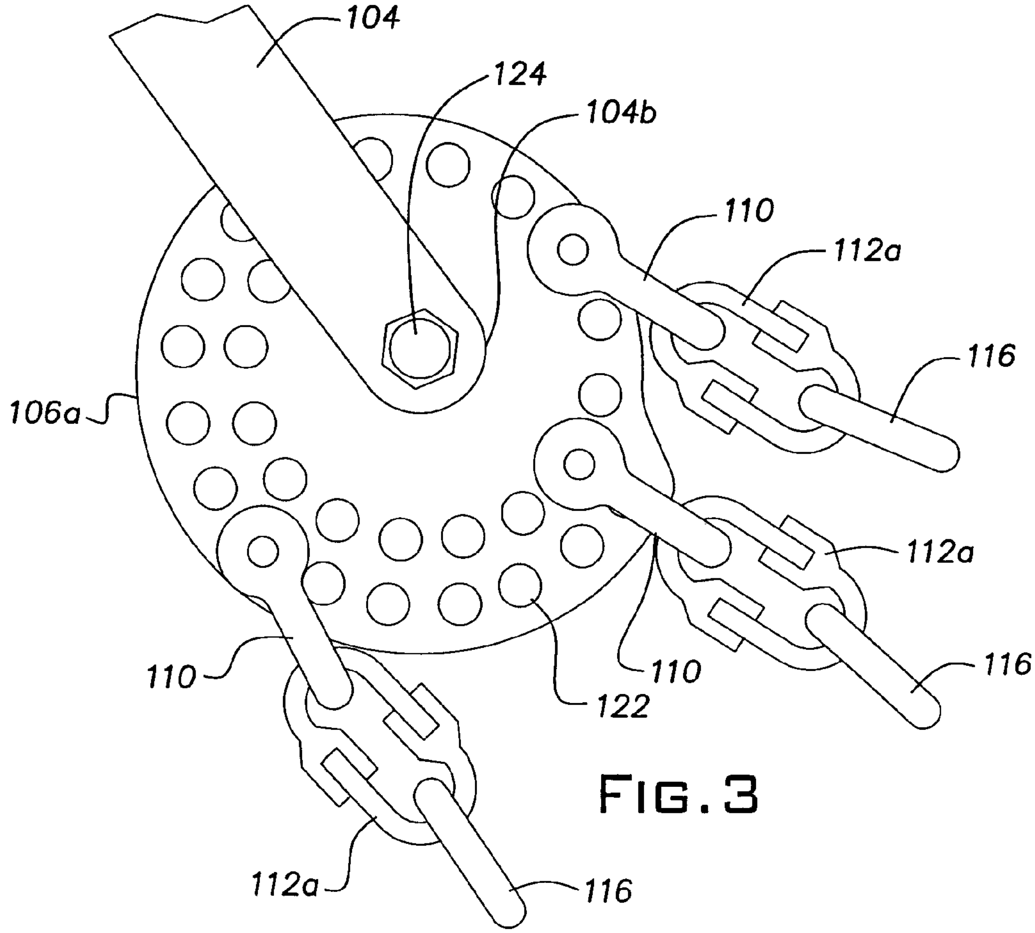
FIG. 3 is a view similar to FIG. 2, but illustrating portions of a plurality of chain assemblies secured to the attachment plate.

Another advantage of the present invention is that it can be simultaneously equipped to carry different articles. Specifically, if the trolley 102 will carry one article during a first assembly procedure and then carry further article(s) during further assembly procedure(s), each attachment plate 106 will receive a plurality of chain mounting assemblies 108, as illustrated in FIG. 3 (showing only the shackles 110 of the chain assemblies 108). One of the chain assemblies 108 will be an active set-up and will support a hanging article. The other chain assemblies 108 will be inactive set-up(s) and will be disposed so as to be out of the way of the active set-up and the assemblers. When an assembly with the article associated with the active set-up concludes and a new article, different from the first article, is to be hung from the trolley 102, the operator must simply choose between the other potential set-ups for the appropriate set-up associated with the article to be hung. The different set-ups can employ differentiating means to assist the operator, such as color-coding.

While the present invention has been described with particularity, it is considered apparent that the present invention is capable of numerous modifications, substitutions, and rearrangements of parts without departing from the scope and spirit of the present invention. Therefore, the invention is not limited to the particular preferred embodiments described hereinbefore, but rather only defined by the claims appended hereto.

Specifically, it is readily apparent that the invention is amenable to a different number of attachment plates 106 and article engaging structures (e.g., hooks 118). Specifically, it is often necessary to add an additional attachment plate 106 and engaging structure to achieve an improved balanced hanging of the article 126. Further, although hooks have been described as article engaging structures hereinbefore, it is contemplated that other structures could be used with equal functionality.

What is claimed is:

1. An attachment plate for use with a hanging transport assembly, the attachment plate comprising:

a center mounting hole to permit rotatable mounting of the attachment plate to the transport assembly; and a plurality of chain mounting holes, said chain mounting holes being adapted to receive a chain assembly, wherein each of the chain mounting holes is disposed at an individual predefined radial distance from the center mounting hole, and whereby an effective chain length, measured from the transport assembly to a connection point, may be adjusted by moving said chain assembly from one of the chain mounting holes to another chain mounting hole.

2. The attachment plate according to claim 1, wherein each of the plurality of chain mounting holes falls along an imaginary line defining an Archimedean spiral.

3. The attachment plate according to claim 2, wherein the chain mounting holes define an outer row of holes and an inner row of holes, wherein each of the holes comprising the outer row of holes are spaced a predetermined distance from an outer peripheral edge of the attachment plate.

4. The attachment plate according to claim 3, wherein each of the holes comprising the inner row of holes are spaced a different distance from the outer peripheral edge of the attachment plate.

5. The attachment plate according to claim 1, wherein the attachment plate has a peripheral edge that is generally a full circle in shape.

6. The attachment plate according to claim 5, wherein the center mounting hole is disposed in a center of the generally circular attachment plate.

7. The attachment plate according to claim 1, wherein the center mounting hole is substantially disposed in a center of the attachment plate.

8. The attachment plate according to claim 1, wherein each individual predefined radial distance from the center mounting hole is unique.

9. A hanging transport assembly, comprising:

a trolley; and, a plurality of chain mounting assemblies, each of said chain mounting assemblies including a mounting plate, an attachment plate, and a chain assembly, said mounting plate connecting said attachment plate to said trolley, wherein said attachment plate defines a center mounting hole and a plurality of chain mounting holes, said attachment plate being rotatably secured to said mounting plate and rotatable about said center mounting hole, and wherein each of the chain mounting holes is adapted to receive the chain assembly and is disposed at an individual predefined radial distance from the center mounting hole, and whereby an effective chain length, measured from the trolley to a connection point, may be adjusted by moving said chain assembly from one of the chain mounting holes to another chain mounting hole.

10. The transport assembly according to claim 9, wherein each of the plurality of chain mounting holes falls along an imaginary line defining an Archimedean spiral.

11. The transport assembly according to claim 10, wherein the chain mounting holes define an outer row of holes and an inner row of holes, wherein the each of the holes comprising the outer row of holes are spaced a predetermined distance from an outer peripheral edge of the attachment plate.

12. The transport assembly according to claim 11, wherein each of the holes comprising the inner row of holes are spaced a different distance from the outer peripheral edge of the attachment plate.

13. A method for adjusting an effective chain length in a hanging transport assembly, said hanging transport assembly including a trolley, an attachment plate rotatably secured to said trolley, and a chain assembly including a chain, said effective chain length being equal to a distance from a chain assembly connection point to the trolley, wherein said attachment plate defines a center mounting hole and a plurality of chain mounting holes, wherein each of said chain mounting holes is spaced a predefined individual radial distance from the center mounting hole, said method comprising the steps of:

rotating the plate so as to access one of said plurality of chain mounting holes;

mounting said chain to one of said chain mounting holes such that an effective chain length has a first value; and demounting the chain from said one of said chain mounting holes and mounting said chain to a second of said chain mounting holes such that the effective chain length has a second value, said second value being different than said first value.

* * * * *